United States Patent
Petitjean

(10) Patent No.: US 6,463,922 B2
(45) Date of Patent: Oct. 15, 2002

(54) WEDGE INTENDED TO BE INSERTED IN A CUTTING SLOT

(75) Inventor: Jean-Paul Petitjean, La Bresse (FR)

(73) Assignee: Graniterie des Ecorces, La Bresse (FR)

( * ) Notice: Subject to any disclaimer, the term of this patent is extended or adjusted under 35 U.S.C. 154(b) by 9 days.

(21) Appl. No.: 09/768,396

(22) Filed: Jan. 24, 2001

(65) Prior Publication Data
US 2001/0025637 A1 Oct. 4, 2001

(30) Foreign Application Priority Data

Jan. 24, 2000 (FR) .......................... 00 00822
Jan. 24, 2000 (FR) .......................... 00 00823

(51) Int. Cl.$^7$ ................................ B28D 1/08
(52) U.S. Cl. ................ 125/21; 125/16.01; 125/16.02; 83/651.1; 83/102.1; 144/363
(58) Field of Search ............... 125/21, 16.02, 125/26; 83/651.1, 102.1; 144/363, 369, 182, 366; 175/61

(56) References Cited

U.S. PATENT DOCUMENTS

| | | | | |
|---|---|---|---|---|
| 3,220,149 A | * | 11/1965 | Dioguardi | 125/21 |
| 3,299,877 A | * | 1/1967 | Grace | 125/21 |
| 4,182,423 A | * | 1/1980 | Ziebarth et al. | 175/61 |
| 4,453,437 A | * | 6/1984 | Ask | 83/171 |
| 4,647,080 A | * | 3/1987 | Sandt et al. | 285/297 |
| 5,253,686 A | * | 10/1993 | Dietz | 144/363 |
| 5,645,040 A | * | 7/1997 | Bieri jun | 125/21 |
| 5,690,092 A | * | 11/1997 | Ogyu | 125/21 |

* cited by examiner

Primary Examiner—George Nguyen
(74) Attorney, Agent, or Firm—Gary M. Cohen

(57) ABSTRACT

A wedge (6, 6') intended to be inserted into a cutting slot is made in two parts (41, 42), the two parts (41, 42) comprising means (3) which allow them to slide one over the other, so as to produce a double wedge (6, 6'), the total thickness of which can vary between a maximum thickness value and a minimum thickness value.

11 Claims, 6 Drawing Sheets

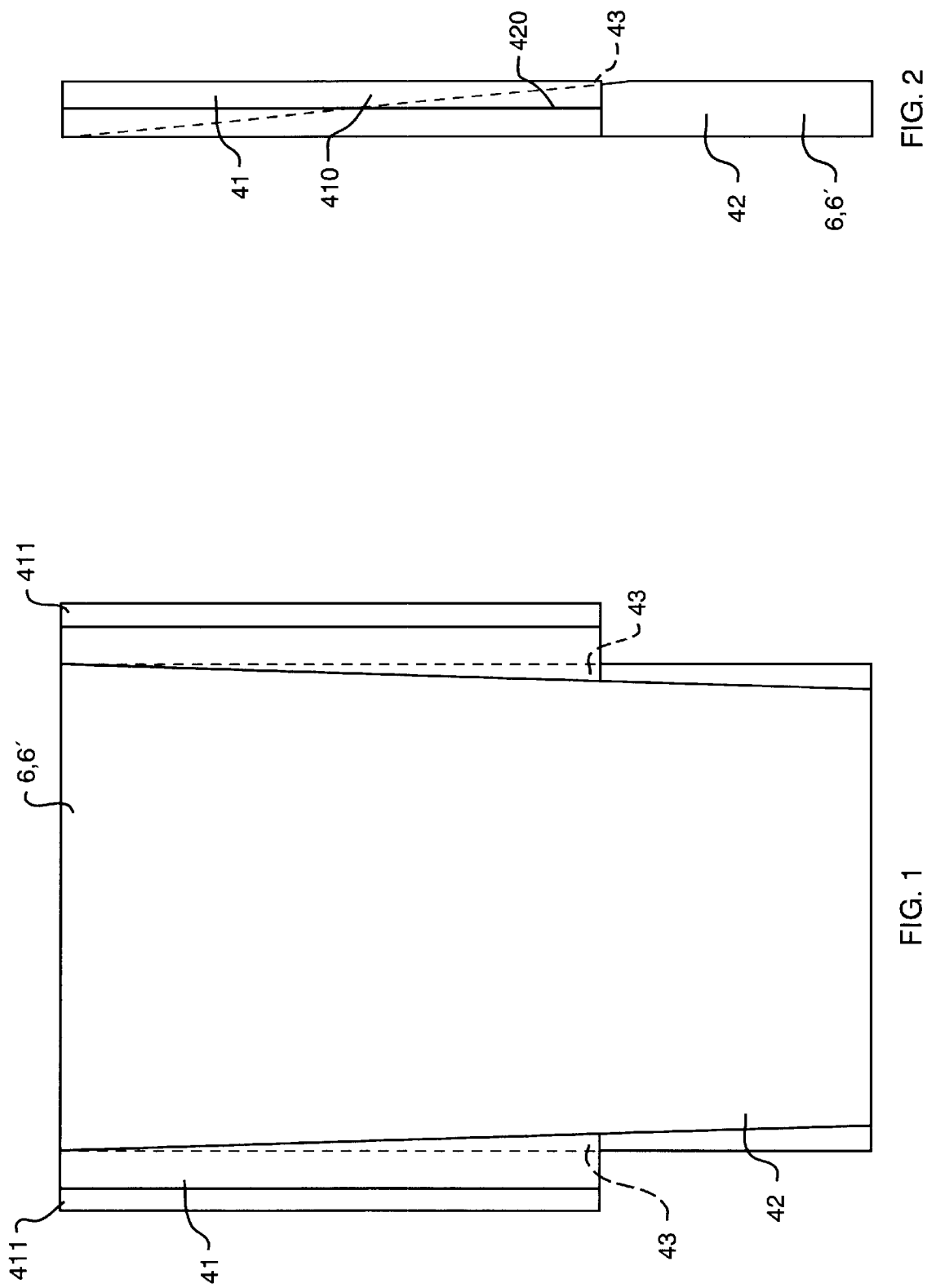

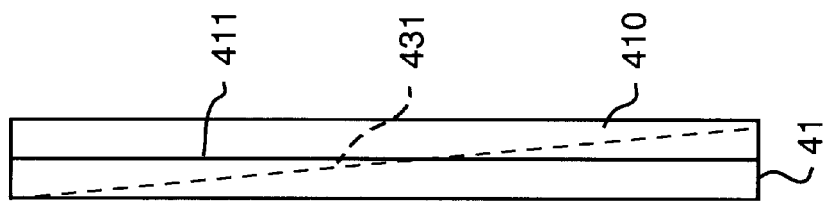
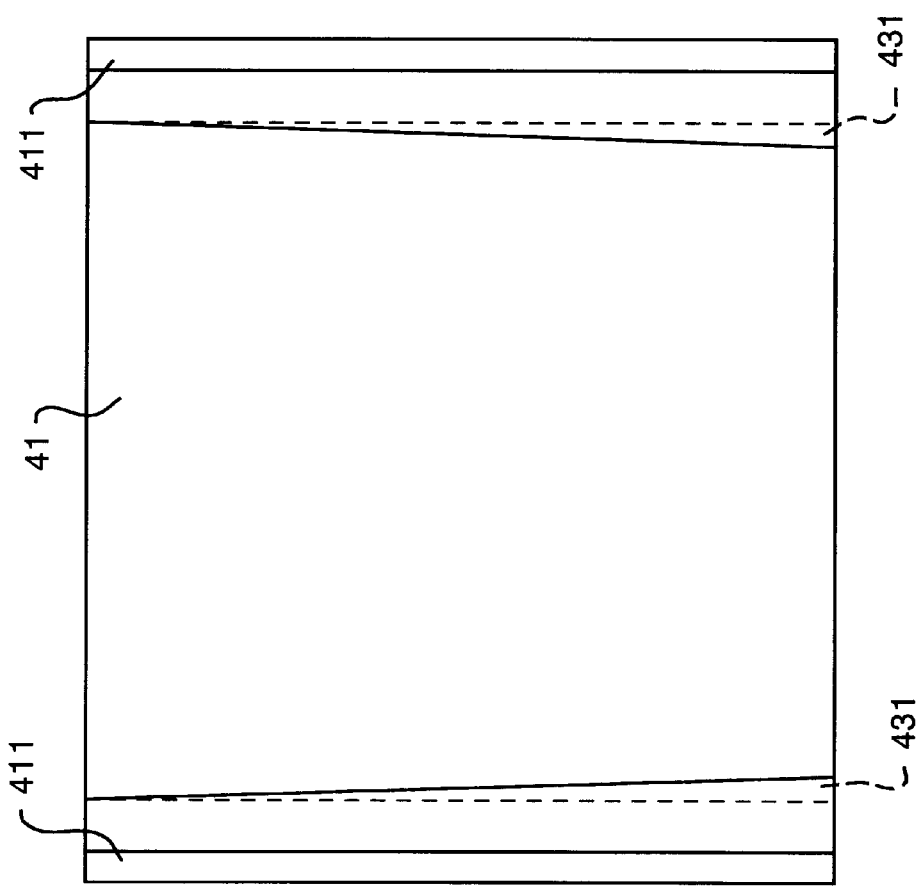
FIG. 5
FIG. 4

WEDGE INTENDED TO BE INSERTED IN A CUTTING SLOT

BACKGROUND OF THE INVENTION

The present invention relates to the field of the cutting of blocks of stone and more particularly to a wedge intended to be inserted in a cutting slot when horizontally cutting a block of stone.

When a block of stone is being cut horizontally, it is absolutely essential that wedges be inserted in the cutting slot so that the upper part of the block of stone does not impede the progression of the cutting wire.

When there is a desire to automate the horizontal cutting of blocks of stone, it is appropriate to produce an automatic device which controls the progress of the cutting wire and an automatic device (possibly the same one) which manages the insertion of the wedges in the cutting slot.

Now, it has been found that as cutting progresses, the cutting wire becomes worn and its thickness reduces by a few tenths of a millimeter.

It therefore follows that the cutting slot does not have the same thickness when the cutting wire is worn as it does when this wire is new and that the wedges have therefore to have different thicknesses according to the state of wear of the cutting wire so as always to be inserted correctly in the cutting slot.

In order to automate the insertion of wedges of different thicknesses into the cutting slot, one solution consists in having, in the store of the automatic device, wedges of thicknesses that vary according to the thickness of the cutting wire, but this makes managing the automation enormously complicated.

SUMMARY OF THE INVENTION

The present invention intends to overcome the drawbacks of the prior art by providing a wedge whose overall thickness can vary between a maximum thickness value and a minimum thickness value.

To do this, the wedge according to the invention is made in two parts, the two parts having means allowing them to slide one upon the other so that the double wedge has the ideal thickness.

Advantageously, the maximum thickness of the double wedge according to the invention corresponds to the thickness of a new cutting wire and the minimum thickness of the double wedge corresponds to the thickness of said cutting wire when it is worn, so that the wedges can always be inserted perfectly into the cutting slot.

Advantageously also, the means which allow the parts to slide one upon the other allow, automatic adjustment of the thickness of the double wedge, by virtue of the forces available upon insertion.

Thus, automating the insertion of the wedges into the cutting slot requires just one single type of wedges and does not entail operations of sorting the wedges before placing them in the store of the insertion device.

According to a few advantageous features of the invention:
  said means consist of two complementing slopes formed respectively on the parts without exerting any parting force and. without exerting any pressure in the cutting slot;
  said means are in the form of two complementing dovetails;
  the part has lateral edges which, at least partially, in section, have the shape of a V, guaranteeing that the wedge can be picked up and engaged in the cutting slot.

Another object of the present invention relates to a method for horizontally cutting a block of stone placed on a fixed frame using a cutting wire, which is unique, mounted on cutting means that can move horizontally and vertically on the frame, of the type comprising a step in which wedges are inserted into the cutting slot by insertion means, characterized in that said wedges are in accordance with any one of the aforementioned characteristics.

According to an advantageous characteristic, said wedges are inserted regularly during a temporary halt in the progression A of the cutting means.

According to another advantageous characteristic, during the wedge-insertion operation, two wedges are inserted simultaneously into the cutting slot, one wedge being inserted respectively from each side of said block of stone by the insertion means.

Another object of the present invention relates to a device for horizontally cutting a block of stone placed on a fixed frame of the type comprising a cutting wire, which is unique, mounted on cutting means that can move horizontally and vertically on the frame, the cutting means being made up of at least one drive flywheel rotated by a motor and a return flywheel, the flywheels having the task of rotating R the cutting wire and means for inserting wedges into the cutting slot, each comprising at least one wedge store, the cutting means and the insertion means are secured together and arranged so they can move vertically on a vertical support capable of moving horizontally with respect to the frame, characterized in that said wedges are in accordance with any one of the aforementioned characteristics.

According to a few advantageous features of the device according to the invention:
  the means of inserting said wedges each comprise an arm which can move with respect to the store, at the end of which is positioned a mobile picking finger tasked with picking up the wedges;
  the arm further comprises, at its end, a wedge-tensioning ram allowing said wedge to be tailored to the size of the slot;
  the store is made up of a wedge box that can move vertically on a vertical slideway and a fixed bottom stop.

The invention will be better understood with the aid of the description given hereinafter of one embodiment thereof which is given by way of nonlimiting example with reference to the appended FIGURES.

BRIEF DESCRIPTION OF THE DRAWINGS

FIG. 1 illustrates the wedge according to the invention, viewed face-on.

FIG. 2 illustrates the wedge according to the invention, viewed from the side.

FIG. 3 illustrates the wedge according to the invention, viewed end-on.

FIG. 4 illustrates the first part of the wedge according to the invention, viewed face-on.

FIG. 5 illustrates the first part of the wedge according to the invention, viewed side-on.

FIG. 6 illustrates the first part of the wedge according to the invention, viewed end-on.

DETAILED DESCRIPTION OF THE INVENTION

Figure 3:
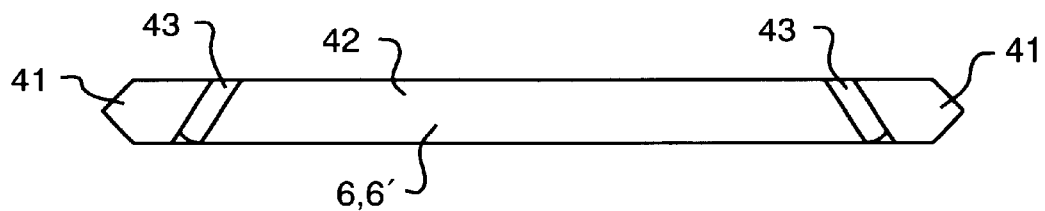

The wedge according to the invention, illustrated in FIGS. 1, 2 and 3, is a wedge (6, 6') intended to be inserted in a cutting slot and is characterized in that it is made in two a parts (41, 42), the two parts (41, 42) comprising means (43) allowing them to slide one upon the other, so as to produce a double wedge (6, 6'), the total thickness of which can vary between a maximum thickness value and a minimum thickness value and automatically adapt to fit the space available in the cutting slot upon insertion.

As a preference, said maximum value of the thickness of the wedge (6, 6') according to the invention corresponds to the thickness of a new cutting wire and said minimum thickness value corresponds to the thickness of said cutting wire when worn.

Thus, the wedges (6, 6') can be inserted automatically and perfectly into this cutting slot, under all circumstances.

In practice, the maximum thickness value of the wedge (6, 6') may, for example, be 11 millimeters, and the minimum thickness value of the wedge (6, 6') may be 9 millimeters.

In a preferred version of the invention, said means (43) consist of two complementing slopes (10, 20) formed respectively one on each of the parts (1, 2), and they are in the form of two complementing dovetails. The dovetail shape of the part (41) is illustrated in FIGS. 4 and 5.

Figure 6:
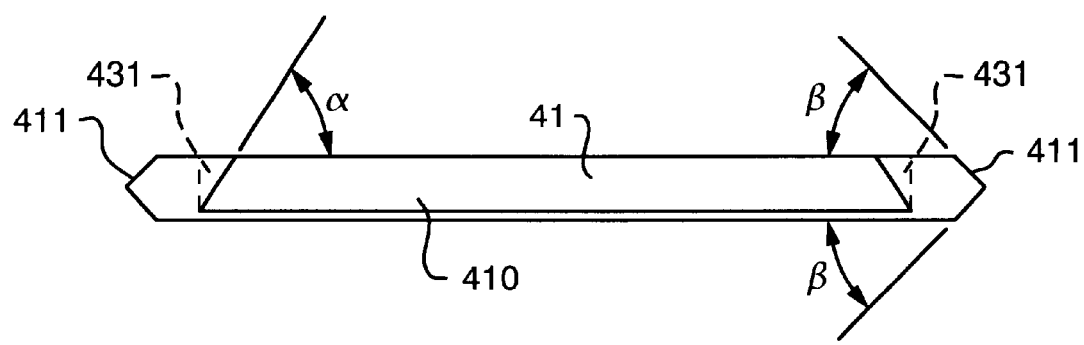

The complementing dovetail shapes also have lateral edges (431) oriented at an angle a close to 60°, as illustrated in FIG. 6, so as to make it easier for the part (42) to penetrate the part (41) and tailor the thickness of the double wedge (6, 6').

In addition, the part (41) has lateral edges (411) which, at least partially, in section, have the shape of a V so as to make the double wedge easier for the wedge-inserting automatic device to insert in the cutting slot. The V shape may, for example, exhibit angles β close to 45°.

Furthermore, the constituent parts (41, 42) of the double wedge (6, 6') are made of a strong plastic such as polyethylene for example.

The method according to the invention is a method for the horizontal cutting of a block of stone (1) placed on a fixed frame (2) using a cutting wire (3) of the diamond wire type, which is unique, mounted on cutting means (4) that are able to move horizontally and vertically on the frame (2), of the type comprising a step of inserting wedges (6, 6'), such as those described hereinafter, in a cutting slot (7) using insertion means (5, 5'). This method is characterized in that said wedges (6, 6') are inserted regularly, during a temporary halt in the progress A of the cutting means (4).

In order to make a horizontal cut in a block of stone (1), it is absolutely essential in fact to insert a wedge (6, 6') in the cutting slot (7) so that the cutting wire can continue to progress and cannot be crushed, but this insertion, the effect of which has to be to hold up the entire part of the block of stone (1) located above the cutting slot (7), requires a certain amount of force and often leads to disruption in the positioning of the diamond wire (3).

It is therefore necessary for said wedges (6, 6') to be inserted regularly, during a temporary halt in the progress A of the cutting means (4).

In addition, it is preferable, during the wedge-insertion operation, for two wedges (6, 6') to be inserted in the cutting slot (7) simultaneously, each wedge (6, 6') being inserted respectively one from each side of said block of stone (1) by the insertion means (5, 5').

Figure 7:
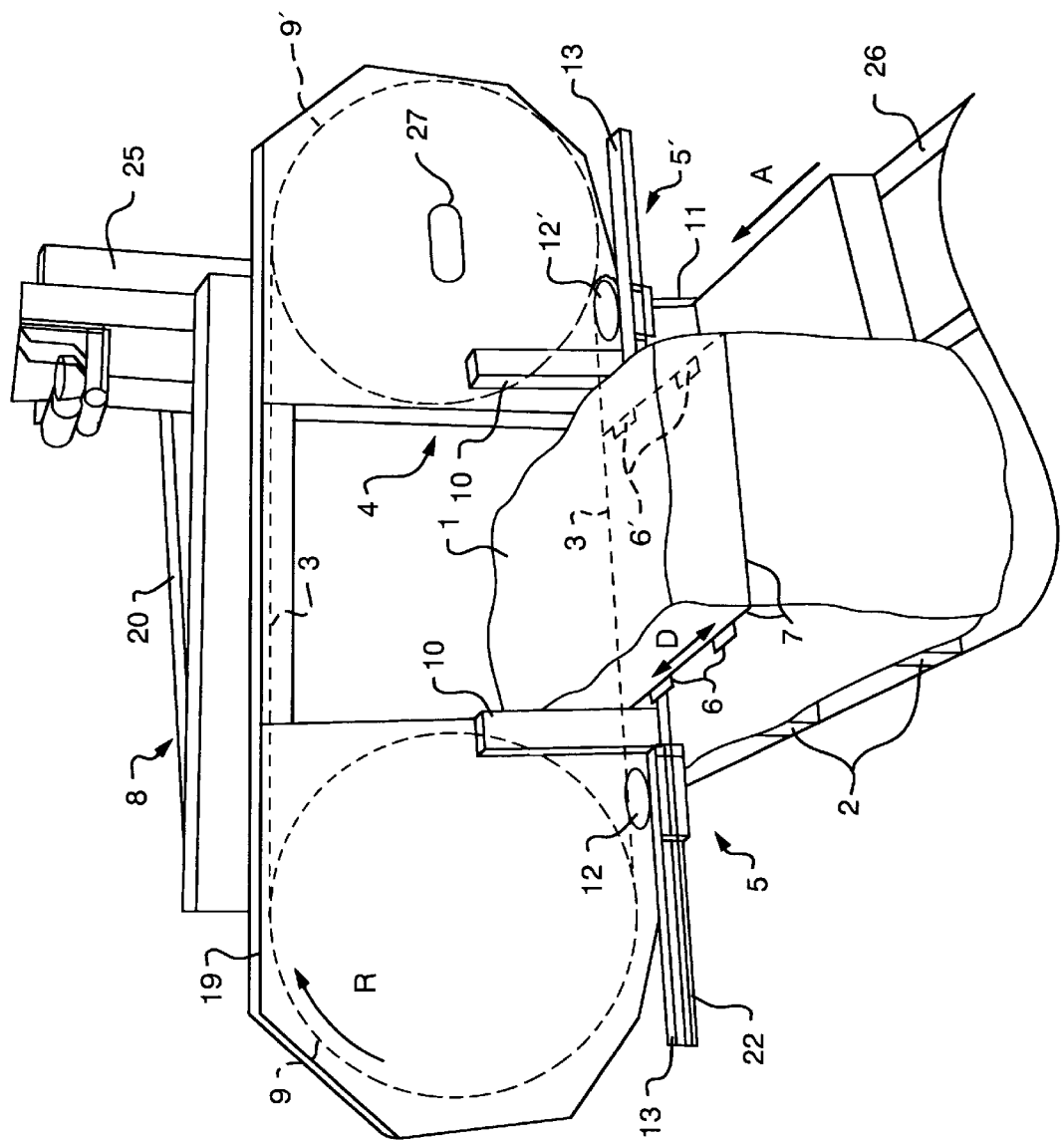
FIG. 7 illustrates a perspective and partial view of the device according to the invention.

The present invention also relates to a device (8), illustrated in FIG. 7, for the horizontal cutting of a block of stone (1).

In this device (8), the cutting means (4) are made up of at least a circular driving flywheel (9) driven in rotation R by a motor and a circular return flywheel (9'), these flywheels being tasked with rotating the diamond wire (3) and the insertion means (5, 5') each comprise at least one store (10).

The device (8) according to the invention is characterized in that the cutting means (4) and the insertion means (5, 5') are secured together by a collection of girders (20) and are arranged so that they can move vertically on a vertical support (11) by virtue of vertical slideways (25), said vertical support (11) being able to be moved horizontally with respect to the frame (2) on horizontal rails (26) secured to the frame (2).

Thus, the precise position of the cutting wire (3) can be programmed accurately using an automatic device tasked with controlling the position and speed of progress of cutting means (4) and of the insertion means (5, 5') with respect to the vertical support (11) and with controlling the position of the vertical support (11) with respect to the fixed frame (2).

In a preferred version of the invention, at least one circular guide flywheel (12, 12') is arranged between the driving flywheel (9) and the cutting slot (7) and/or between the cutting slot (7) and the return flywheel (9').

Thus, when two guide flywheels (12, 12') are arranged on each lateral side of the cutting slot (7), the cutting wire (3) is guided accurately as it enters the block of stone (1) and as it leaves the block of stone (1).

For the guide flywheels (12, 12') to be more efficient, it is preferable for the axis of each guide flywheel (12, 12') to be arranged vertically, secured to the insertion means (5, 5') and to the cutting means (4).

Figure 8:
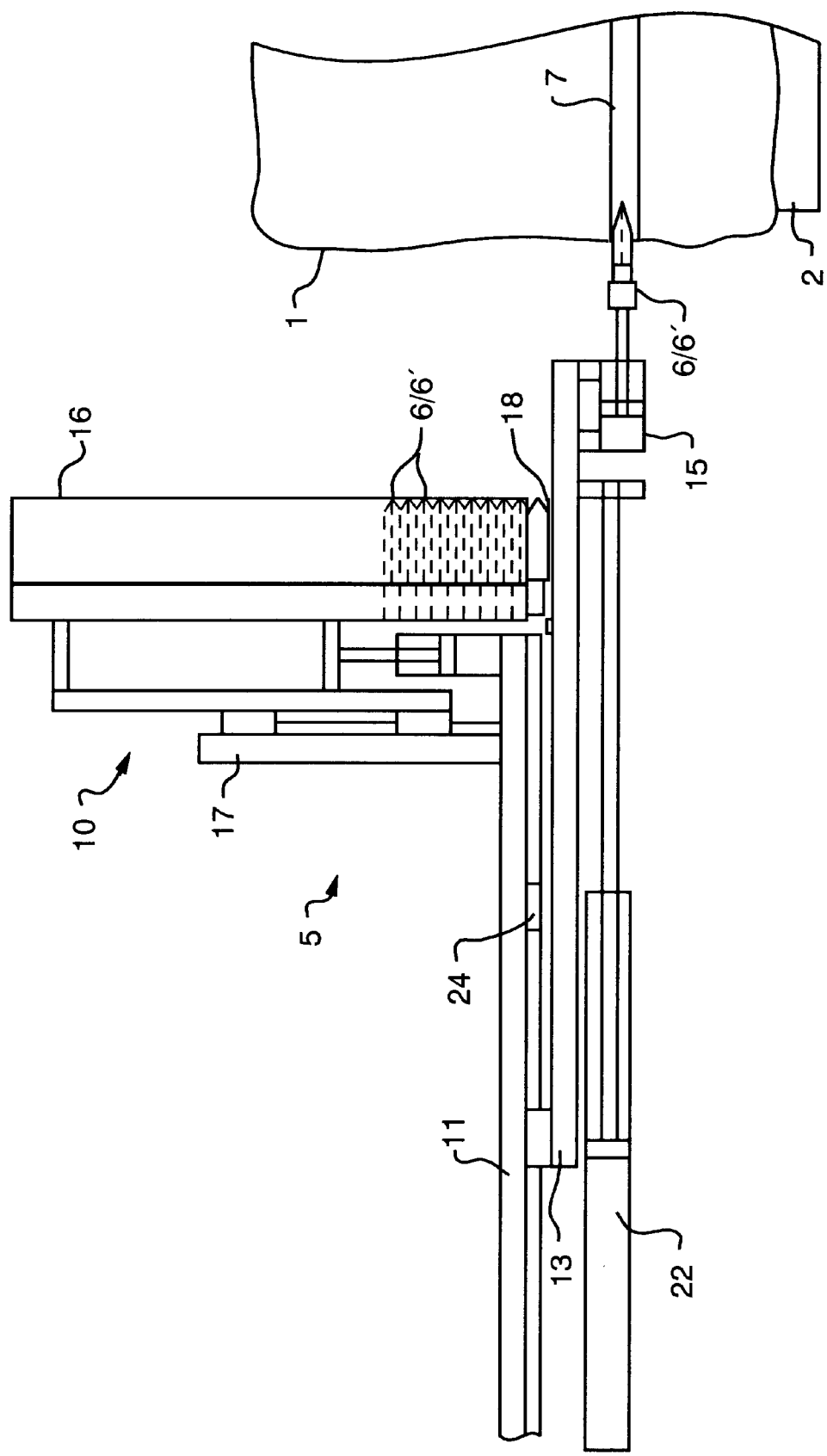
FIG. 8 illustrates a partial view, face-on, of the insertion means.
Figure 9:
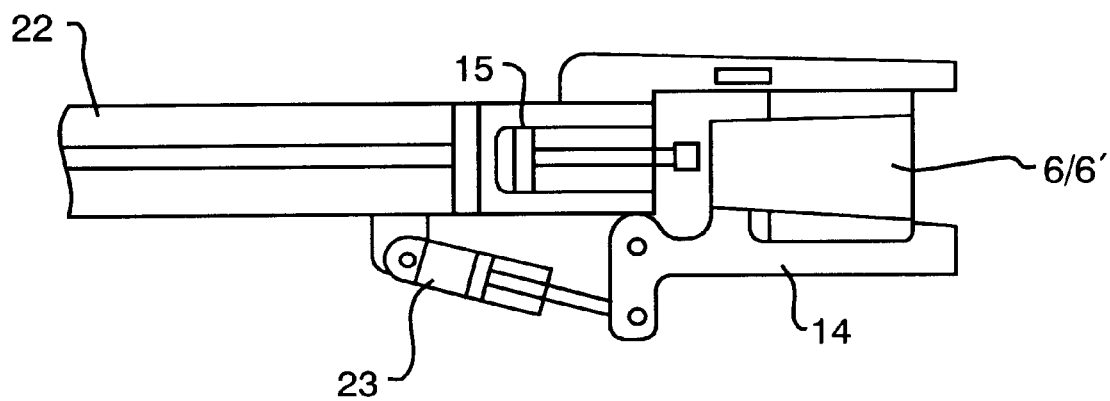
FIG. 9 illustrates a partial view, from above, of the insertion means.

In a preferred version of the invention, the insertion means (5, 5') each comprise an arm (13) which can move with respect to the store (10), at the end of which is positioned a mobile picking finger (14) tasked with picking up the wedges (6, 6') at the lower end of the store (10) as illustrated in FIGS. 8 and 9.

For greater clarity, the picking finger (14) has not been depicted in FIG. 8.

The arm (13) further comprises, at its end, a wedging ram (15) intended to finish the insertion of and lock the wedges (6, 6') in place in the cutting slot (7) so as to prevent any sagging of the upper part of the block of stone (1).

The store (10) is made up of a wedge box (16) which can move vertically on a vertical slideway (17) and of a fixed bottom stop (18).

The cutting means (4), made up of at least the driving flywheel (9), the return flywheel (9') and the cutting wire (3) are arranged in a protective casing (19) as illustrated in FIG. 7.

For a better understanding of the invention, a description of one exemplary implementation of the device according to the invention is given hereinbelow.

In order to cut through the block of stone (1) the cutting wire (3) begins to cut through the block of stone horizontally.

As cutting progresses, the progress A is halted regularly so that a wedge (6, 6') can be inserted into the cutting slot (7)

;on each side of the block of stone (1). The distance D between two wedges on one and the same side of the block of stone is programmed according to the width of the block of stone.

On each wedge-positioned cycle, with the progress A halted, the arm (13), actuated by the double-acting pneumatic ram (22) advances by sliding over a horizontal element of the vertical support (11) and pushes the wedge (6, 6') into the cutting slot (7).

As soon as the pressure in the double-acting pneumatic ram (22) is high enough, the wedging ram (15) tensions the wedge (6, 6') in the cutting slot (7).

When the pressure tension in the wedging ram (15) is reached, the picking finger (14) is moved away by the ram (23), and the arm (13) retreats.

When the double-acting pneumatic ram (22) of the arm (13) comes into contact with the retreated-position detector, the store (10) drops down the height of one wedge (6, 6') onto the bottom stop (18), by virtue of the vertical slideway (17).

The arm (13) then moves forward onto an intermediate stop (24), the picking finger (14) still open.

Thus, the only remaining operation is to close the picking finger (14) onto the next wedge (6, 6'), for the arm (13) to be retreated slightly and for the store (10) to be raised again, to prepare the arm (13) for the next insertion cycle.

Cutting can then resume its progress A.

It will be understood that the wedge according to the invention makes it possible, without manual intervention, to cut granite, for example, into slices of different thicknesses.

What is claimed is:

1. A wedge (6, 6') intended to be inserted into a cutting slot, characterized in that it is made in two parts (41, 42), the two parts (41, 42) comprising means (43) allowing them to slide one over the other so as to produce a double wedge (6, 6'), the total thickness of which can vary between a maximum thickness value and a minimum thickness value, characterized in that said maximum thickness value corresponds to the thickness of a new cutting wire and in that said minimum thickness value corresponds to the thickness of a worn cutting wire.

2. The wedge (6, 6') as claimed in claim 1, characterized in that said mean's (3) consist of two complementing slopes (410, 420) formed respectively on the parts (41, 42) without exerting any parting force and without exerting any pressure in the cutting slot.

3. The wedge (6, 6') as claimed in claim 1, characterized in that said means (3) are in the form of two complementing dovetails.

4. The wedge (6, 6') as claimed in claim 1, characterized in that the part (41) has lateral edges (411) which, at least partially, in section, have the shape of a V, guaranteeing that the wedge can be picked up and engaged in the cutting slot.

5. A method for horizontally cutting a block of stone (1) placed on a fixed frame (2) using a cutting wire (3), which is unique, mounted on cutting means (4) that can move horizontally and vertically on the frame (2), of the type comprising a step in which wedges (6, 6') are inserted into a cutting slot (7) by insertion means (5, 5'), characterized in that said wedges (6, 6') are made in two parts (41, 42), the two parts (41, 42) comprising means (43) allowing them to slide one over the other so as to produce a double wedge (6, 6'), the total thickness of which can vary between a maximum thickness value and a minimum thickness value, wherein said maximum thickness value corresponds to the thickness of a new cutting wire and wherein said minimum thickness value corresponds to the thickness of a worn cutting wire.

6. The method for horizontally cutting a block of stone (1) as claimed in claim 5, characterized in that said wedges (6, 6') are inserted regularly during a temporary halt in the progression A of the cutting means (4).

7. The method for horizontally cutting a block of stone (1) as claimed in claim 5, characterized in that during the wedge-insertion operation, two wedges (6, 6') are inserted simultaneously into the cutting slot (7), one wedge (6, 6') being inserted respectively from each side of said block of stone (1) by the insertion means (5, 5').

8. A device (8) for horizontally cutting a block of stone (1) placed on a fixed frame (2) using a cutting wire (3), which is unique, mounted on cutting means (4) that can move horizontally and vertically on the frame (2), the cutting means (4) being made up of at least one drive flywheel (9) rotated by a motor and a return flywheel (9'), the flywheels having the task of rotating R the cutting wire (3) and means (5, 5') for inserting wedges into a cutting slot (7), each comprising at least one wedge store (10), the cutting means (4) and the insertion means (5, 5') are secured together and arranged so they can move vertically on a vertical support (11) capable of moving horizontally with respect to the frame (2), characterized in that said wedges are made in two parts (41, 42), the two parts (41, 42) comprising means (43) allowing them to slide one over the other so as to produce a double wedge (6, 6'), the total thickness of which can vary between a maximum thickness value and a minimum thickness value, wherein said maximum thickness value corresponds to the thickness of a new cutting wire and wherein said minimum thickness value corresponds to the thickness of a worn cutting wire.

9. The device (8) as claimed in claim 8, characterized in that the means (5, 5') of inserting said wedges each comprise an arm (13) which can move with respect to the store (10), at the end of which is positioned a mobile picking finger (14) tasked with picking up the wedges (6, 6').

10. The device (8) as claimed in claim 9, H characterized in that the arm (13 further comprises, at its end, a wedge-tensioning ram (15) allowing said wedge to be tailored to the size of the slot.

11. The device (8) as claimed in claim 8, characterized in that the store (10) is made up of a wedge box (16) that can move vertically on a vertical slideway (17) and a fixed bottom stop (18).

* * * * *